(12) United States Patent
Reusche (10) Patent No.: US 6,640,747 B2
(45) Date of Patent: Nov. 4, 2003

(54) BIRD BATH

(75) Inventor: Thomas K. Reusche, Elburn, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 0 days.

(21) Appl. No.: 10/263,500

(22) Filed: Oct. 3, 2002

(65) Prior Publication Data

US 2003/0101942 A1 Jun. 5, 2003

Related U.S. Application Data

(63) Continuation-in-part of application No. 09/990,535, filed on Nov. 21, 2001, now Pat. No. 6,484,666.

(51) Int. Cl.[7] .......................... A01K 7/02; B05B 17/08; E03B 9/20
(52) U.S. Cl. .......................... 119/69.5; 119/74; 239/17; 239/28
(58) Field of Search .......................... 119/69.5, 72, 74; 417/40; 137/386, 397, 398, 409; 239/17, 23, 28

(56) References Cited

U.S. PATENT DOCUMENTS 69,994 A * 10/1867 Hegart .......................... 239/23

(List continued on next page.)

FOREIGN PATENT DOCUMENTS

| DE | 4415705 A1 | * | 1/1995 |
| GB | 2128269 A | * | 4/1984 |

OTHER PUBLICATIONS

Web page, Birdzilla–Bird Baths, Bird Heaven Pedestal Baths, printed on Nov. 21, 2001.*
Web page, Blue Ridge Birdworks, Heaters, printed on Sep. 25, 2001.*

(List continued on next page.)

Primary Examiner—Yvonne Abbott
(74) Attorney, Agent, or Firm—McAndrews, Held & Malloy, Ltd.

(57) ABSTRACT

A bird bath includes a bird bath basin adapted to hold water, a water reservoir adapted to hold water, and an electrically operated pump adapted to pump water from the reservoir to the basin. The pump has an inlet in fluid communication with the reservoir and an outlet in fluid communication with a flow opening positioned in the lowest part of the base. When the pump is operating it pumps water from the reservoir, through the flow opening, and into the basin. When the pump is not operating, water in the basin drains under gravity flow through the flow opening, through the pump and into the reservoir. As a result, the basin may be automatically filled and drained at selected times during the day. A mechanism, such as a timer or photocell, may be provided for controlling operation of the pump. The bird bath may include a heater for heating the water in the reservoir. The basin can be mounted on a base, or alternatively it can be mounted on a structure such as a deck, fence, post or building. The water reservoir and the pump may be part of a unitary structure that is connectable to the basin by conduits to permit water to flow between the reservoir and the basin. When the bird bath includes a base, the base may be constructed to house the water reservoir and the pump.

26 Claims, 6 Drawing Sheets

U.S. PATENT DOCUMENTS

| | | | | |
|---|---|---|---|---|
| 3,713,583 A | * | 1/1973 | Gruber | 239/17 |
| 3,901,440 A | * | 8/1975 | Baker | 239/28 |
| 4,640,226 A | | 2/1987 | Liff | |
| 4,836,142 A | * | 6/1989 | Duback | 119/255 |
| 4,883,022 A | * | 11/1989 | B. A. Barker | 119/73 |
| 5,105,771 A | * | 4/1992 | Schafer | 119/73 |
| 5,299,769 A | * | 4/1994 | Reusche et al. | 248/219.2 |
| 5,326,032 A | * | 7/1994 | Quillin | 239/20 |
| 5,353,741 A | * | 10/1994 | Gryzlak | 119/69.5 |
| 5,440,836 A | * | 8/1995 | Lee | 47/60 |
| 5,452,683 A | * | 9/1995 | Poffenroth | 119/73 |
| 5,743,212 A | | 4/1998 | Forjohn | |
| 5,749,316 A | | 5/1998 | Deagan | |
| 5,782,035 A | | 7/1998 | Locke et al. | |
| 5,784,998 A | | 7/1998 | Manzer | |
| 5,845,605 A | | 12/1998 | Malamphy | |
| 5,918,415 A | * | 7/1999 | Locke et al. | 47/79 |
| 6,029,899 A | * | 2/2000 | Walker | 239/17 |
| 6,053,422 A | * | 4/2000 | Polzin et al. | 239/17 |
| 6,079,951 A | | 6/2000 | Morton | |
| 6,151,448 A | | 11/2000 | Reusche et al. | |
| 6,257,560 B1 | * | 7/2001 | Kim | 261/36.1 |
| 6,450,122 B1 | * | 9/2002 | Frank | 119/259 |
| 6,469,281 B1 | * | 10/2002 | Reusche et al. | 219/438 |

OTHER PUBLICATIONS

Web pages, Wild Birgds and Water Accessories, Bird Bath Heaters, printed on Sep. 25, 2001.*

Web page, Wild Bird Mart, Bird Bath, Standing Heated printed on Sep. 25, 2001.*

Web page, Wild Bird Mart, Bird Bath, Heated, printed Sep. 25, 2001.*

Web page, Heated Bird Baths by Allied Precision Industries, printed on Feb. 8, 2001.*

Web page, Pail and Bird Bath De–icers by Allied Precision Industries, printed on Sep. 25, 2001.*

Web page, Bucket Heater by Allied Precision Industries, printed on Sep. 25, 2001.*

* cited by examiner

FIG. 5

BIRD BATH

RELATED APPLICATIONS

This application is a continuation-in-part of application Ser. No. 09/990,535, filed Nov. 21, 2001, now U.S. Pat. No. 6,484,666 the disclosure of which is hereby incorporated in its entirety.

BACKGROUND OF THE INVENTION

A local bird population will remain faithful to a particular area if a ready source of water and food is available. Consequently, bird baths are popular for attracting birds to residential homes, for example, and they may promote an interest in, and the well being of wild birds.

U.S. Pat. No. 5,784,998 discloses a bird bath having a base supporting a bird bath basin. The base includes a water chamber that extends upwardly through the center of the basin. Openings extend between the chamber and the basin to allow gravity flow of water from the chamber and into the basin. Regulating the water level in the chamber controls water level in the basin. To this end, the chamber includes a float-operated valve for controlling the supply of water from a remote source and into the chamber. The float rises and falls depending on the level of water in the chamber. The float is attached to the valve such that the valve is closed when the water reaches a predetermined maximum level within the chamber and is opened when the water level in the chamber falls below a predetermined chamber to refill the chamber to the desired level. As water in the basin is depleted, e.g. by use or evaporation, the float moves downward, thereby opening the valve and restoring the water level in the chamber and in the basin. A similar design is disclosed in U.S. Pat. No. 5,743,312.

Both of these bird bath designs suffer from several drawbacks. First, because there is no continuous flow of water into the basin, the water will freeze easily in cold weather. In order to prevent freezing in cold whether, such designs would require some type of mechanism for heating the water. In this respect, the '998 patent discloses a heater positioned within the chamber. However, because the water does not continuously circulate between the chamber and the basin, the ability of this heater to effectively prevent freezing of water in the basin is limited, particularly in extremely cold weather.

As a result, many bird baths rely on heaters that directly heat the water in the basin. Such heating mechanisms typically take one of two forms. First, they can be in the form of an immersion heater which is placed directly in the basin during cold weather. Electricity is delivered to the heater by a power cord, which is draped over the edge of the basin and connected to a remote source of electricity. Besides being unsightly, such heaters must be installed and removed on a seasonal basis.

Alternatively, bird baths have heaters embedded in the wall of the basin or disposed within a double walled basin, as is shown in U.S. Pat. No. 4,640,226. Such designs are undesirable from a manufacturing standpoint because they limit the materials that can be used to construct the basin. In particular, the designs of the '226 patent will work with plastic, for example, but they are not feasible when using materials such as concrete.

Additionally, the bird baths disclosed in the '998, '312 and '226 patents remain full all of the time. This is undesirable because birds typically only use the bath during the day. However, at night a full bird bath tends to attract nuisance undesirable animals such as raccoons and possums. In addition, the constantly full water basin serves as a breeding ground form mosquitoes and other insects.

U.S. Pat. No. 6,079,951 describes a bird bath having a water reservoir, a bird bath basin, a water control valve for admitting fresh water into the reservoir and an air lift pump for pumping water from the reservoir to the bird bath basin. The design of the '951 patent suffers from several drawbacks. First, it requires a remote air compressor for delivering air to the air lift pump. The tubing which extends between the air compressor and the pump must be arranged to form a loop above the highest water level in the reservoir to protect against siphoning. As a result, it is not feasible to mount the air compressor within the bird bath. Additionally, the '951 patent does not provide for heating the water in the bath, or for draining the bath basin at night.

BRIEF SUMMARY OF THE INVENTION

According to certain aspects of an embodiment of the present invention, a bird bath includes a basin adapted to hold water, a water reservoir adapted to hold water, an electric pump adapted to continuously pump water from the reservoir to the basin, and an overflow means for channeling overflow water from the basin and into the reservoir. The basin may be constructed for mounting on a base or another structure, such as a deck, fence, post or building. When a base is provided, it may be constructed to house the water reservoir and the pump. The pump and reservoir may be part of a unitary structure sized for insertion into the base. When no base is provided, the unitary pump/reservoir structure can be placed on a surface, such as the ground, or can be secured to another structure, e.g., by a mounting bracket.

The overflow means may include a water inlet positioned in the basin at the desired maximum water level and a water channel extending between the water inlet and the reservoir. The bird bath may include means for refilling the reservoir with water from a remote source so as to maintain a predetermined amount of water in the reservoir.

According to one embodiment the bird bath includes a means selectively operating the pump and means for draining the basin into the reservoir when the pump is not operating. The means for selectively delivering electricity to the pump may include a switch, a timer, or a photocell, for example. The means for draining may include a drain extending between the lowest portion of the basin and the reservoir. The drain is adapted to drain water from the basin and into the reservoir when the pump is not operating. In this respect, the pump may include an outlet in fluid communication with a flow opening positioned the base, and preferably in the lowest part of the base. When the pump is operating it pumps water from the reservoir, through the flow opening, and into the basin. When the pump is not operating, water in the basin drains under gravity flow through the flow opening, through the pump and into the reservoir.

The foregoing summary, as well as the following detailed description of the preferred embodiments of the present invention, will be better understood when read in conjunction with the appended drawings. For the purpose of illustrating the preferred embodiments of the present invention, there is shown in the drawings, embodiments which are presently preferred. It should be understood, however, that the present invention is not limited to the arrangements and instrumentality shown in the attached drawings.

DETAILED DESCRIPTION OF THE INVENTION

Figure 1A:
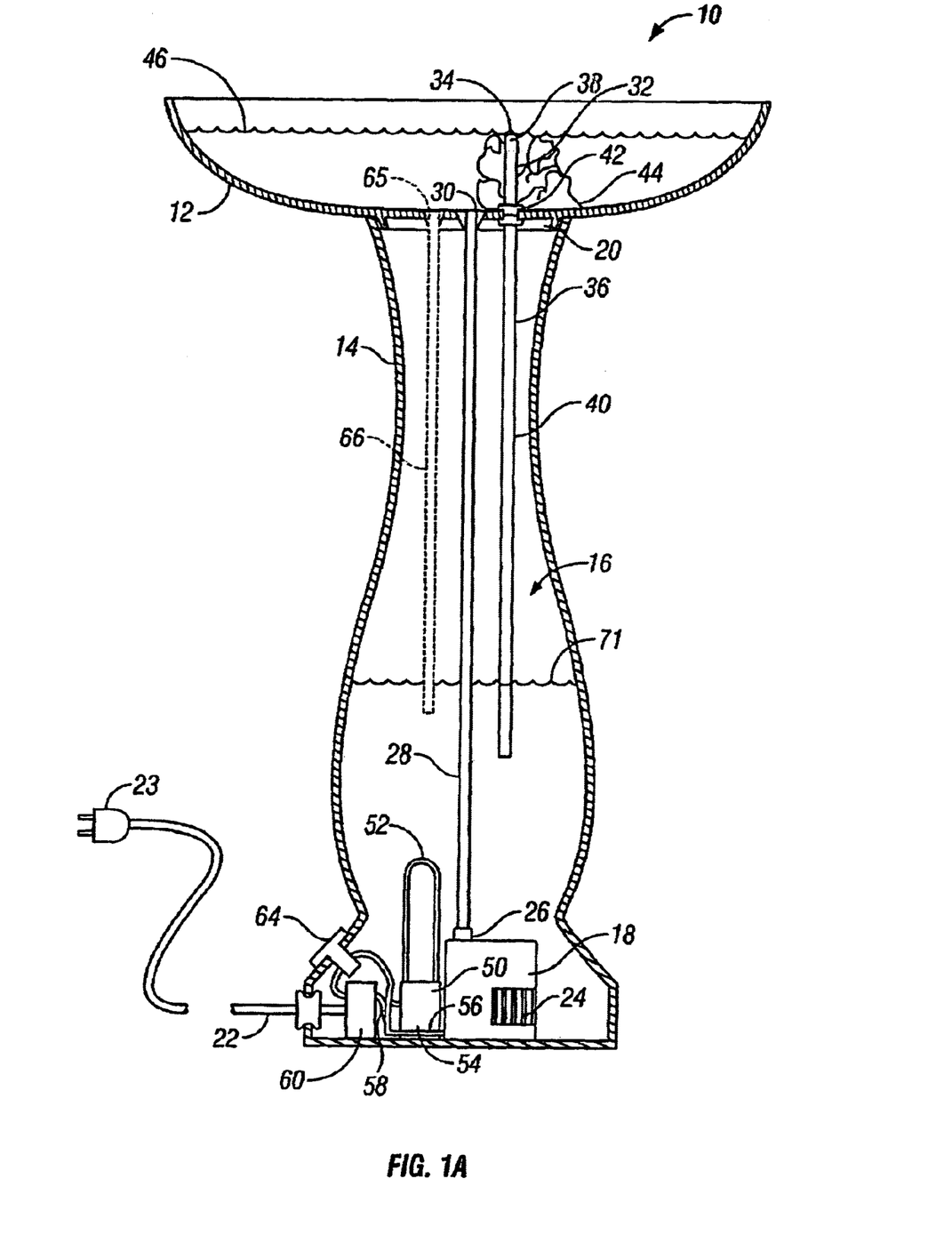
FIG. 1A is a cross-sectional view of a bird bath constructed in accordance with certain aspects of a first embodiment of the present invention.

Referring to FIG. 1A, a bird bath 10 constructed in accordance with certain aspects of an embodiment of the present invention includes a bird bath basin 12 which is adapted to hold water, a base 14 on which the basin is mounted, a water reservoir 16 contained within the base, and an electrically powered pump 18 contained within the base and being adapted pump water from the reservoir to the basin.

Figure 3:
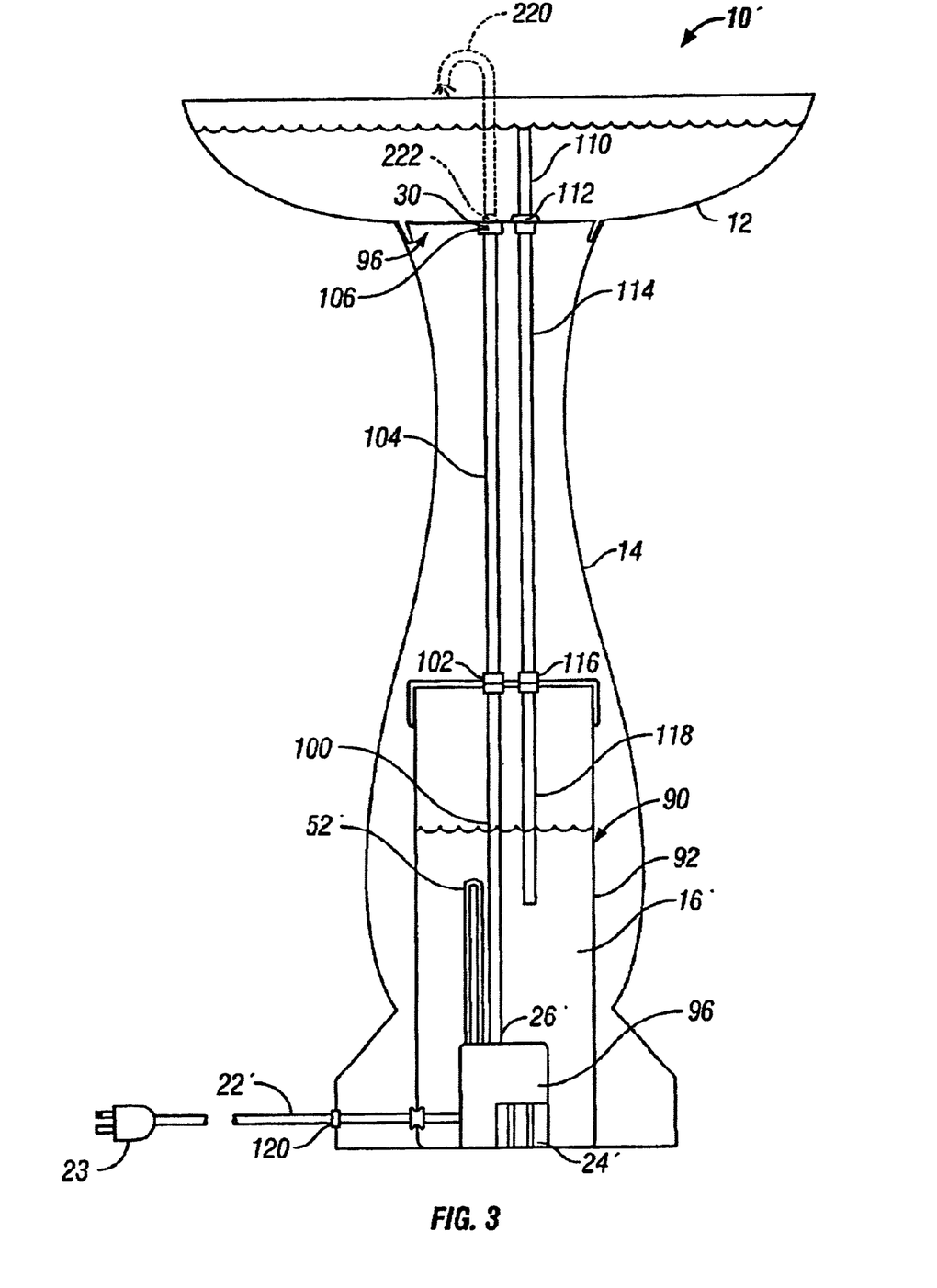
FIG. 3 is a cross sectional view illustrating certain aspects of a second embodiment of the present invention.

The water reservoir can be integrally formed with the base (see, e.g., FIG. 1A) or it can be separately formed by the basin and mounted therein (see, e.g., FIG. 3). In FIG. 1A, the base 14 comprises a pedestal adapted to be placed on the ground. Alternatively, the base could, for example, be configured so it can be attached to a deck. The base shown in FIG. 1 has a hollow interior that defines the water reservoir 16. To this end, the base may be molded from a polymeric material such as nylon or plastic. Alternatively, the hollow pedestal could be formed from a material such as stone, concrete or metal and be lined with a sealant to prevent water from leaking out of the base.

The base is configured to rest on the ground and has a top configured to support the basin. In this respect, the basin includes a downwardly extending annular ring 20 configured to mate with a reciprocal opening formed in the top of the base 14. Forming the basin separately from the base offers several advantages. First, it allows the bird bath to be broken down for shipping. In addition, it allows for flexibility in using different basin and base designs. It also allows the purchaser to upgrade the bird bath, e.g. by adding a heater or pump at a later time.

The pump 18 is mounted in the reservoir and is supplied with electricity by a power cord 22 that extends through the sidewall of the base 14 in a sealed manner. The distal end of the power cord terminates in a conventional male plug 23 configured for insertion into an electrical outlet (not shown) for delivering power to the pump 18. The pump operates continuously when it is supplied with electricity. A suitable pump is available from Little Giant as a model 567606 (retail)/519910 (OEM). That particular pump has a lift of 4 feet and a capacity of 120 gallons per hour. When operating, the pump 18 draws water in through its inlet 24 and discharges it from its outlet 26. A tube 28 has its lower end connected to the outlet 26 of the pump and its upper end connected to a flow port 30 in the basin 12 for delivering water to the basin. The tube 28 may be a formed of conventional nylon tubing, for example, and may be interconnected with the pump and the basin by conventional fluid couplers.

An overflow mechanism 32 is provided for limiting the maximum water level 46 in the basin 12. The combination of the pump 18 and the overflow mechanism 32 maintain the water level 46 in the basin at a constant level when the pump is operating. The overflow mechanism includes a water inlet 34 positioned within the basin at height corresponding to the desired maximum water level within the basin. A water channel 36 extends between the water inlet 34 and the reservoir 16 so as to direct overflow water from the inlet back into the reservoir. In the illustrated embodiment, the overflow mechanism consists of an upper tube 38 and a lower tube 40 that are joined together through the bottom wall of the basin 12 by a conventional fluid connector 42. The upper tube 38 extends upwardly near the center of the basin and defines the water overflow inlet 34 at its upper end. The lower tube 40 extends downwardly from the basin and into the reservoir 16. The upper tube 38 may be made from rigid PVC, for example, so that it is self-supporting in an upright position as shown. The upper tube 38 may be concealed by decorative rock formation 44, for example, to improve the aesthetic appearance of the bird bath. The lower tube 40 may be formed from flexible nylon tubing, for example. Preferably the outlet end of the lower tube 40 extends below the surface of the water in the reservoir 16, thereby minimizing the noise generated by water flowing through the overflow mechanism 32. It will be appreciated that the water overflow mechanism 32 can take numerous other forms without departing from the scope of the invention. For example, a single tubular member, instead of two tubes as shown, could define the water channel. Alternatively, the basin could have the water overflow channels located in its walls, e.g. integrally forming the channels in the wall or by mounting tubing within a double walled basin.

In operation, the pump 18 draws water in through its inlet 24 and discharges it from its outlet 26. The water is pumped upwardly through the tube 28 and discharged from the port 30 and into the basin 12. The basin 12 continues to fill until the water level 46 reaches the inlet 34 of the overflow mechanism 32. As water rises 46 to the level of the inlet 34 it is recirculated to the reservoir 16 via the tubes 38, 40.

Figure 1B:
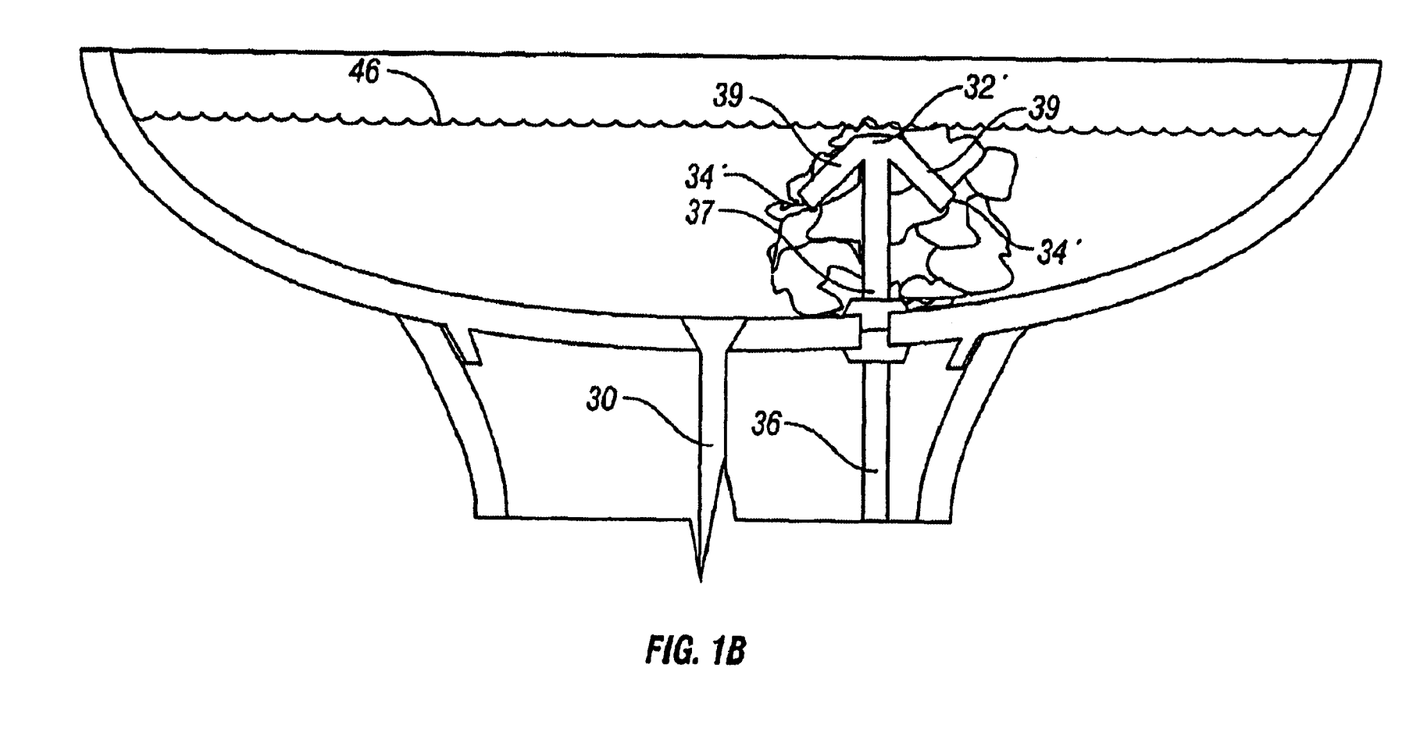
FIG. 1B is a partial cross-sectional view illustrating an alternative overflow mechanism that can be used in the bird bath of FIG. 1A.

FIG. 1B illustrates an alternative embodiment of an overflow mechanism 32'. The overflow mechanism 32' is generally the same as the one shown in FIG. 1A, except for the construction of the upper tube 38'. In this embodiment, the upper tube 38' of the overflow mechanism is constructed such that its water inlet port(s) 34' are positioned below the water level in the basin during normal operation. In this respect, the tube includes an upstanding leg 37 and at least one leg 39 that angles downwardly from the upper end of the upstanding leg and terminates in a water inlet port 34'. As is shown, the upper tube 38' may be concealed by decorative rock formation 44, for example, to improve the aesthetic appearance of the bird bath. As the water level in the basin rises, it eventually reaches the inlet port(s) 34. As the water level in the basin continues to rise, it flows upwardly in the leg(s) 39 until it reaches a level sufficient to flow into the upstanding leg 39. The overflow water flows through the upstanding leg 39, down through the tube 40 and into the reservoir. The overflow mechanism 32' of FIG. 1A is beneficial in reducing the likelihood of debris, such as leaves, from plugging the overflow mechanism.

The bird bath 10 may also include a heater 50 for heating the water contained in the reservoir in cold climates. The heater may be in the form of a submersible heater positioned within the reservoir 16, as is shown in FIG. 1. The heater 50 includes a heating element 52, such as a cal rod, that extends into the reservoir 16 to heat its contents. The power cord 22 is interconnected with the heating element through a temperature control device, e.g. a thermostat, not shown, for delivering electrical power to the heating element in a controlled fashion so as to regulate the temperature of the water in the reservoir. A housing 54 seals the interconnection between the heating element, the temperature control device and the power cord against moisture infiltration. The temperature control device is in the form of a thermostat or temperature responsive switch adapted to cycle the heating element on and off to maintain the temperature of the water in the reservoir within a preselected temperature range. Further details of how to construct a suitable heater can be obtained from U.S. Pat. No. 6,151,448, the disclosure of which is hereby incorporated by reference.

Preferably, a single power cord is used to supply power to both the heater and the pump. In this respect, the power cord 22 extends into the base is split into two supply cords 56, 58 via a sealed junction box 60. One of the supply cords 56 is interconnected with the pump 18 and the other supply cord 58 is interconnected with the heater 50.

The bird bath may include a means for selectively filling and draining the basin 12 with water from the reservoir 16. The means may include a pump control means for selectively activating and deactivating the pump and a drain means for draining the basin when the pump is deactivated. In its simplest form the pump control means may be embodied in a manually operated switch (not shown) adapted to control operation of the pump. The switch could, for example, be positioned on the base and be electrically interconnected between the pump and the power cord for controlling the delivery of electricity to the pump.

Alternatively, the pump control means may automatically cycle the pump on and off to drain the basin at preselected times. In this embodiment, the automatic pump control means may include a photocell 64 interconnected with the pump for deactivating the pump at night. The photocell can be connected at a variety of locations. For example, it can be connected proximal to the plug 23 or integrally formed with the plug. Alternatively, as shown in FIG. 1, it can be mounted on the base 14 and electrically connected between the junction box 60 and the pump 18. Mounting the photocell 64 at this location is advantageous because it allows a single power cord to be used to supply power to both the heater and the pump, while still allowing the heater to operate at night. This is particularly desirable because ambient temperatures tend to decrease at night, thereby increasing the likelihood that the water in the reservoir will freeze in the absence of heating by the heater.

Alternatively, the automatic pump control means may include a timer (not shown) configured to turn the pump on and off at selected times. Again the timer may be located at any location between the outlet and the pump, as was discussed above in connection with the photocell.

As can be seen in FIG. 1A, the drain means may be provided by positioning the outlet 30 of the tube 28 at the lowest point in the basin 12. As a result, when the pump 18 is turned off, the outlet 30 serves as a drain between the basin 12 and the reservoir 16. Specifically, when the pump is turned off, water will flow from the basin 12 into the outlet 30, down the tube 28, through the pump, out of the pump's water inlet 24, and into the reservoir 16.

Alternatively, or in addition, the drain means may include a reduced diameter drain opening 65 located in the bottom of the basin 12. A tube 66 extends downwardly from the drain opening and into the reservoir 16. As will be appreciated, the drain opening 65 is sized so that the flow through the opening 65 is less than the discharge rate of the pump. As a result, when the pump is operating, the basin will fill with water, but a portion of the water output by the pump continuously drains through the opening 65 and into the reservoir. Providing the drain opening 65 is advantageous, because the continuous return of water to the reservoir reduces the likelihood that the pump will be operated without water in the reservoir. If the bird bath is not refilled, its water level will eventually drop, e.g. due to use and/or evaporation, to a level that is insufficient to keep the basin 12 full, thereby signaling to the user that additionally water needs to be added to the bird bath.

Alternatively, or in addition, the drain means can be provided by a solenoid operated valve (not shown), for example, positioned in the lowest part of the basin. The valve can be interconnected with the pump control means so as to close when the pump is operational and open when the pump is turned off.

Providing an automatic pump control means, such as the photocell or timer, is advantageous over a manual control means, such as the switch, because it allows the basin to be automatically filled and drained at preselected times during the day. Draining the basin at night lessens the chance of animals, such as raccoons, climbing onto the bath to drink.

Figure 2:
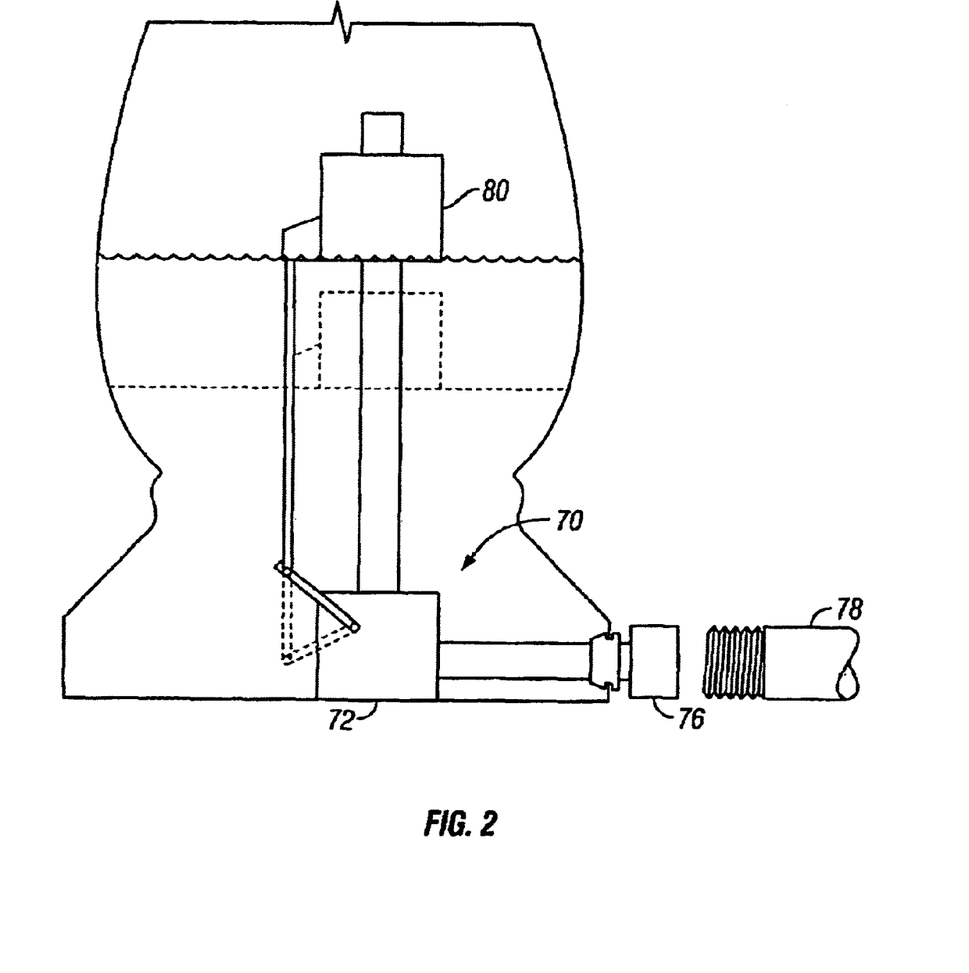
FIG. 2 is a partial cross-section view illustrating a refill mechanism that can be used in connection with the bird bath of FIG. 1A.

As is shown in FIG. 2, the bird bath 10 may also include a refill mechanism 70 for automatically refilling the reservoir 16 with water from a remote source so as to maintain a predetermined amount of water in the reservoir 16. The refill mechanism 70 may be in the form of a float-actuated valve 72 positioned in the reservoir 16. The valve's inlet is interconnected with a garden hose coupler 76 mounted in the sidewall of the base 14. The garden hose coupler presents a male connecter on the outer wall of the base to allow a garden hose 78 to be interconnected between the base and a water spigot (not shown) for delivering water to the reservoir 16 through the valve 72. With the hose connected and the spigot turned on, the water level 71 in the reservoir 16 will be automatically maintained at the desired level by the float valve 72. In particular, as the water level in the reservoir drops, e.g., due to use or evaporation, the float 80 will drop. This causes the valve 72 to open, allowing allow water to flow into the reservoir. As the water level rises, the float 80 will rise until it shuts the valve and terminates the flow of water into the reservoir.

FIG. 3 illustrates an embodiment of bird bath 10' having a pump module 90 which is configured for mounting the in the base 14. The pump module 90 includes a housing 92 defining a water reservoir 16'. The housing 92 is sized so that it can be inserted through the top opening 96 in the base. This is advantageous because it allows the bird bath to be sold with or without the pump, thereby allowing a single bird bath design to be sold in a variety of configurations. For example, a purchaser could initially purchase the base 14 and the basin 12 and later upgrade the bird bath by purchasing the pump module 90.

An integral pump/heater unit 96 is mounted within the housing 92. The pump/heater unit functions in generally the same manner as the separately formed pump 18 and heater 50 in the embodiment of FIG. 1A. It will be appreciated that the unit 96 could also be used in the embodiment of FIG. 1A. It will also be appreciated that the pump module could also incorporate an automatic refill mechanism, as was discussed above in connection with FIG. 2.

The outlet 26' of the pump connected is through a tube 100 to a coupler 102 mounted in the top wall of the housing 92. A second tube 104 extends between the coupler 102 and coupler 106 mounted in the bottom wall of the basin 12. An overflow tube 110 is connectable at its bottom end to a coupler 112 mounted in the bottom of the basin. The other end of the coupler 112 is connectable through a tube 114 to a coupler 116 mounted in the top of the housing 92. The other end of the coupler 116 is connected to a tube 118, which extends downwardly into the housing 92. A power cord 22' extends from the pump/heater unit and through the sidewall of the housing in a sealed manner. The power cord terminates in male plug, as was described above. The plug can be extended through an opening 120 in the base and plugged into an electrical receptacle for delivering power to the pump/heater 96. The cord can include a control means, such as a photocell, timer or switch, for controlling operation of the pump. As will be appreciated, the power cord may be wired such that the control means only controls operation of the pump. Operation of the heater is preferably regulated by a thermostat formed integrally with the heater.

The basin can include plugs (not shown) installed in the couplers 106, 112 so that the bird bath 10 can be used without the pump module 90. The plugs seal the couplers 106, 112 so that basin 12 can be manually filled with water, e.g., by using a garden hose.

The pump module 90 is installed by removing the basin 12 to gain access to the interior of the base 14. The pump module 90 and basin are then interconnected via the tubes 104, 114. Any plugs are also removed from the couplers 106, 112 at this time. The power cord plug 24' is then extended through the top opening 96 of the base and out of the cord opening 120 in the bottom base. The cord opening 120 can be initially plugged or formed as a knockout, so that the base 14 can be used to hold sand or water if the bird bath is to be used without the pump module 90. The pump module 90 is then lowered into the base, while the cord is simultaneously pulled through the opening 120. Once the module 90 is installed, the basin 12 is lowered into place on the base 14. The bird bath is then filled with water by pouring water into the basin 12. The water flows from the basin 12, into the discharge outlet 30 in the bottom of the basin, travels down though the tubes 104, 100, out of the pump's inlet 24' and into the reservoir 16'. Once the reservoir 16 is filled to the desired level, the pump may be activated by inserting the plug 23 into an outlet. When the pump is operational, it draws in water from the reservoir through its inlet. The water is pumped up through the tubes 100, 104 and into the basin 12. The water level continues to rise until it reaches the top of the overflow tube 110. Overflow water flows enters the overflow tube 110 and travels down through the return tubes 114, 118 and into the reservoir 16', where it is recycled by the pump. When the pump turns off, water from the basin drains back into the reservoir in the manner described above in connection with FIG. 1A. In this respect, it will be appreciated that a reduced diameter drain 65 as described above, may also be employed in the embodiment of FIG. 3.

Figure 4:
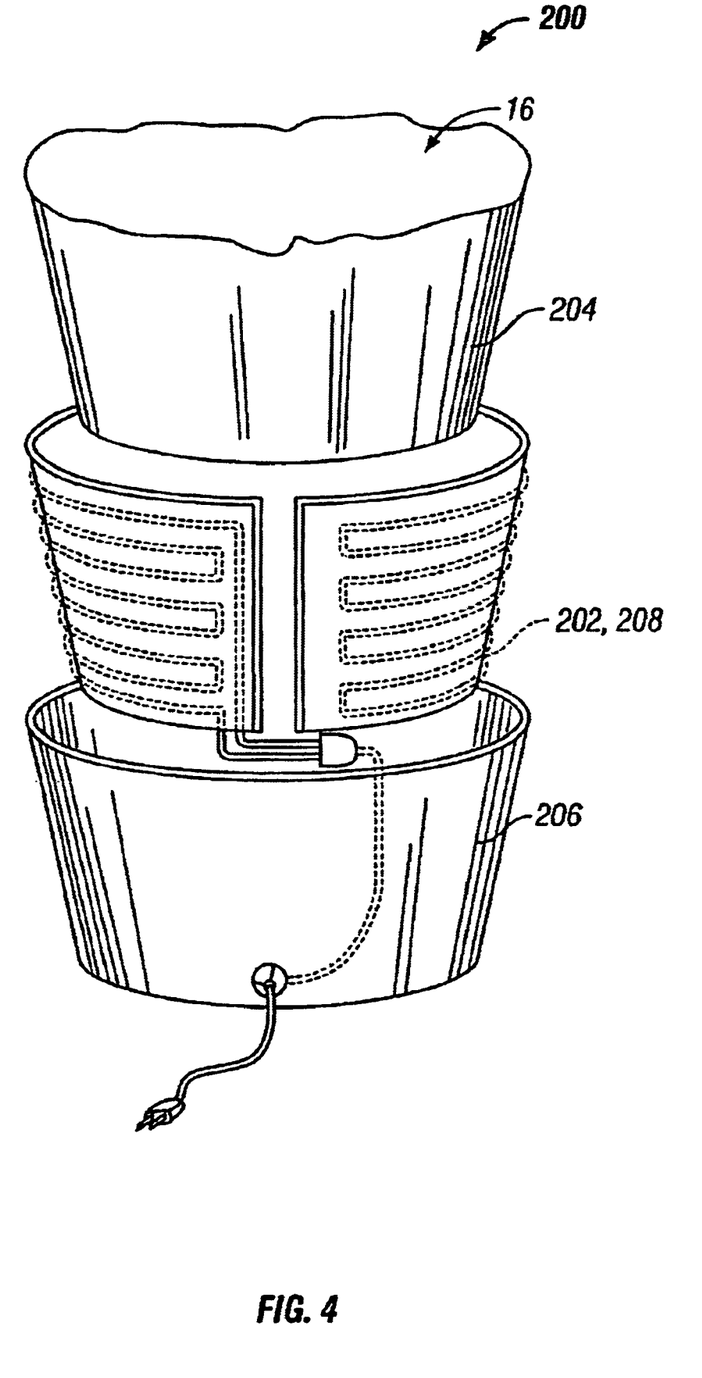
FIG. 4 is a partial perspective cross-sectional view illustrating certain aspects of an alternative heater design that can be used in the bird baths shown in FIGS. 1A and 3.

FIG. 4 generally shows an alternative heater design that can be used in either of the above embodiments. The heater 200 shown in FIG. 4 is in the form of a heating element 202 embedded in the wall of the vessel defining the water reservoir. For example, in the embodiment of FIG. 1, the base 12 could be formed of with a double walled sidewall defined by an inner wall 204 and an outer wall 206. A heater, such as a foil heater 208, is mounted between the inner and outer walls for heating the water in the reservoir 16. A similar design could be used in the embodiment of FIG. 3 by forming the housing 92 with a double walled sidewall. The foil heater 208 preferably includes an integral temperature control device (not shown) form controlling operation of the heater, as was discussed above. It will be appreciated that the heating element could also be embedded by molding it into the sidewall of the base 14 or housing 92.

Several other variations are also possible. For example, the outlet port 30 could be configured to receive a fountain attachment 220 as is generally shown in FIG. 3. The fountain attachment may include at least one drain opening 222 in the bottom of the fitting to permit the basin 12 to drain when the pump is turned off. As will be appreciated, some of the water output by the pump will be discharged through the drain opening 222, as opposed to through the outlet of the fountain attachment 220. The drain opening 222 is sized such that the flow therethrough is less than the pump's discharge rate, thereby ensuring that the fountain attachment continues to discharge water. Additionally, a filter (not shown) could be provided for filtering contaminates from water flowing through the overflow mechanism. Such a filter could, for example be placed at the top or bottom of the overflow pipe. The heater could also be in the form of a heater imbedded in the wall of the vessel defining the water reservoir, as is generally shown in FIG. 4.

Figure 5:
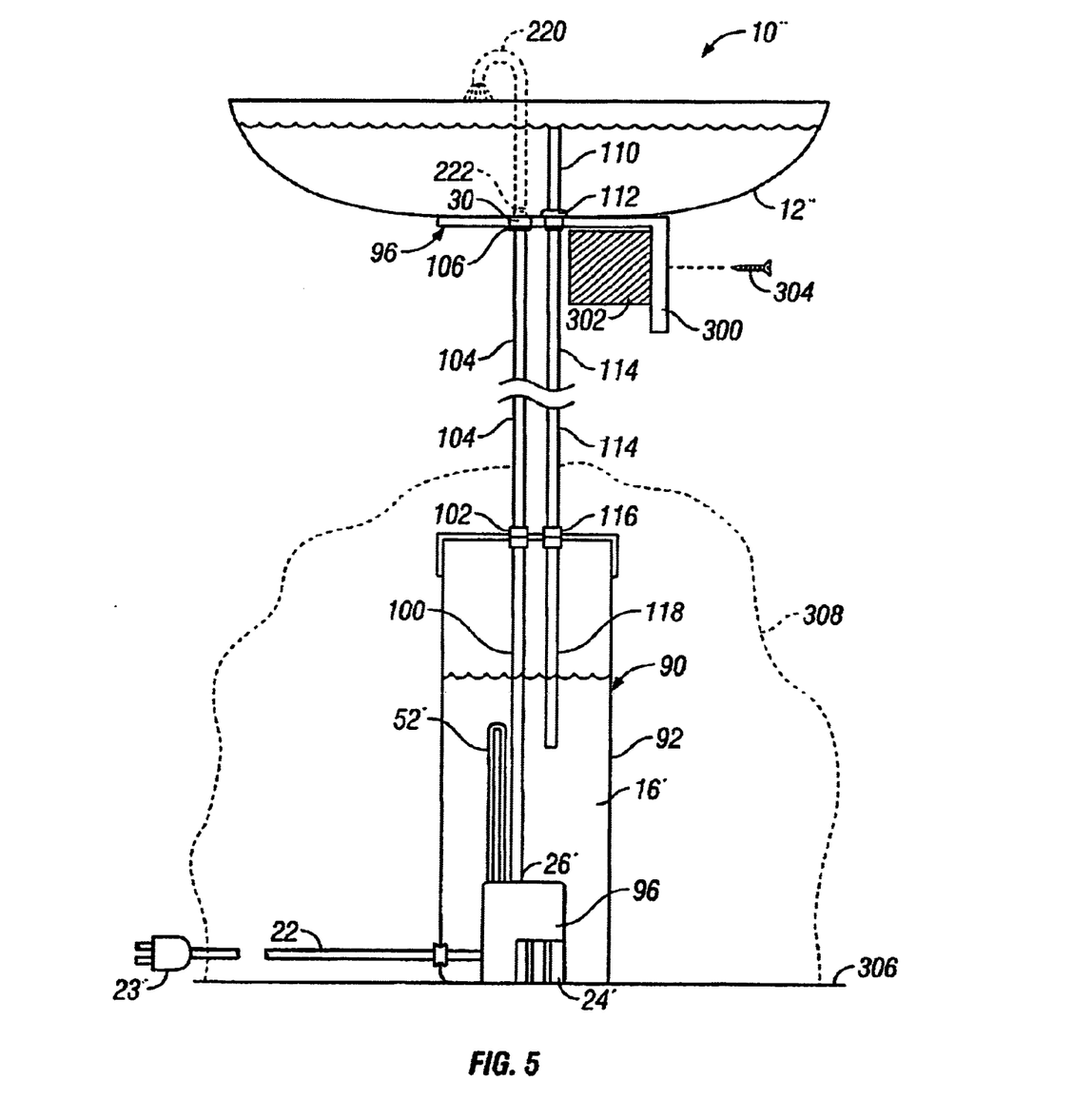
FIG. 5 is a cross-section view of a bird bath according to certain aspects of another embodiment of the present invention.

FIG. 5 illustrates an embodiment of bird bath 10" having a basin 12" configured for mounting on a structure such as a deck, fence, post, building structure, etc. For this purpose, the bird bath 10" may include a mounting bracket 300 that can be used to mount the basin 12" on a separate structure 302 via fasteners 304. The mounting bracket 300 is merely illustrative of one means for mounting the basin 12". It will be appreciated that a variety of other means can be used to mount the basin to a variety of structures. Alternatively, the basin 12" can be used with a base, such as an open, decorative base, that is not constructed for housing the pump module.

The pump module 90 is of generally the same construction as was described above. Hence, it will not be described in detail. The pump module 90 may be placed on a flat surface 306, such as the ground. Alternatively, it may be secured to a separate structure, e.g., by a mounting bracket (not shown). A decorative cover 308, such as a hollow, faux rock, may be used to conceal the pump module 90. The pump module 90 is interconnected with the basin 12" by tubing 104, 114 in the manner described above. The bird bath 10" may include other features and modifications as described elsewhere herein.

A bird bath constructed in accordance with the present invention provides a number of advantages. The water reservoir provides a large supply of water for filling the basin, thereby reducing the frequency with which water needs to be added to the bath. An automatic refill mechanism may be provided for eliminating the need to manually refill the bird bath with water. Continuous operation of the pump imparts movement of the water in the basin, which tends to attract birds to the bath and also makes it more attractive for the owner to look at. Continuously recycling the water between the basin and the reservoir, keeps the water cleaner. As a result, there is less potential for algae growth and mud build up. It also reduces the potential for the bird bath to serve as a breeding ground for insects, such as mosquitoes. Providing a means for automatically draining the basin at night is advantageous because it lessens the likelihood that animals, such as raccoons, will drink from the bird bath. This keeps the water cleaner and reduces the likelihood that the bird bath will be tipped over by a larger animal. The bird bath may include a heater located in the base, thereby eliminating the need to provide a heater in the basin. Hence a one-piece basin can be used, as opposed to a two-piece basin. A one-piece basin provides the flexibility to use a variety of materials, including plastic, stone, metal, and concrete, to construct both the basin and the base. The modular design allows a single bird bath design to be sold in a variety of configurations. For example, the same bird bath can be sold with or without the pump, heater and/or refill mechanism. These components can be constructed so that they can be added later by the purchaser, thereby making the bird bath upgradeable. Also, the basin can be designed from mounting on a base or another structure, such as a deck.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A bird bath comprising:
   a bird bath basin adapted to hold water;
   a water reservoir;
   an electric pump adapted to continuously pump water from the reservoir to the bowl; and
   an overflow mechanism for channeling overflow water from the bird bath basin and into the reservoir, the overflow mechanism comprises a water inlet positioned in the basin at the desired maximum water level and a water channel extending between the water inlet opening and the reservoir.

2. A bird bath as set forth in claim 1, further comprising means for refilling the reservoir with water from a remote source so as to maintain a predetermined amount of water in the reservoir.

3. A bird bath as set forth in claim 1, further comprising means for selectively operating the pump and means for draining the basin into the reservoir when the pump is not operating.

4. A bird bath as set forth in claim 1, further comprising a heater adapted to controllably heat the water in the reservoir to maintain it within a predetermined temperature range.

5. A bird bath as set forth in claim 1, further comprising a mounting assembly for connecting the basin to a separately formed structure.

6. A bird bath as set forth in claim 1, wherein the water reservoir is formed separately from the basin.

7. A bird bath as set forth in claim 1, wherein the pump is contained within the reservoir.

8. A bird bath as set forth in claim 1, further comprising a housing which contains the pump and defines the water reservoir.

9. A bird bath comprising:
   a bird bath basin adapted to hold water;
   a water reservoir contained within the basin;
   an electrically operated pump contained within the base and being adapted to continuously pump water from the reservoir to the bowl so long as electricity is supplied to the pump;
   an overflow means for channeling overflow water from the bird bath basin and into the reservoir so as to prevent the water level in the basin from exceeding a desired maximum level, the overflow means comprising a water inlet positioned in the basin at the desired maximum water level and a water channel extending between the water inlet opening and the reservoir;
   means for draining the basin when the pump is not operating; and
   means for selectively delivering electricity to the electric pump so as to selectively fill and drain the basin.

10. A bird bath as set forth in claim 9, wherein the means for draining comprises a drain positioned at the lowest portion of the basin and extending to the reservoir so as to drain water from the basin and into the reservoir when the pump is not operating.

11. A bird bath as set forth in claim 9, wherein said means for selectively delivering electricity to the pump comprises a photocell or a timer.

12. A bird bath as set forth in claim 9, further comprising a mounting assembly for connecting the basin to a separately formed structure.

13. A bird bath as set forth in claim 9, wherein the water reservoir is formed separately from the basin.

14. A bird bath as set forth in claim 9, wherein the pump is contained within the reservoir.

15. A bird bath as set forth in claim 9, further comprising a housing which contains the pump and defines the water reservoir.

16. A bird bath comprising:
    a bird bath basin adapted to hold water;
    a water reservoir adapted to hold water;
    an electrically operated pump contained with the reservoir, the pump having an inlet in fluid communication with the reservoir and an outlet in fluid communication with a flow opening positioned in the lowest part of the basin, whereby when the pump is operating it pumps water from the reservoir, through the flow opening, and into the basin, and whereby when the pump is not operating water in the basin drains under gravity flow through the flow opening, through the pump and into the reservoir.

17. A bird bath as set forth in claim 16, further comprising means for selectively delivering electricity to the pump so as to selectively fill and drain the basin.

18. A bird bath as set forth in claim 17, wherein said means for selectively delivering electricity to the pump comprises a photocell or a timer.

19. A bird bath as set forth in claim 17, wherein the water reservoir is formed separately from the basin.

20. A bird bath as set forth in claim 17, wherein the pump is contained within the reservoir.

21. A bird bath as set forth in claim 17, further comprising a housing which contains the pump and defines the water reservoir.

22. A bird bath as set forth in claim 17, further comprising a mounting assembly for connecting the basin to a separately formed structure.

23. A bird bath comprising:
    a bird bath basin adapted to hold water;
    a pump module comprising:
      a housing defining a reservoir adapted to hold water;
      a pump contained in the housing and being interconnectable with the basin for pumping water from the reservoir to the basin; and
      a power cord having a first end interconnected with the pump and a second end terminating in a male electrical plug; and
    an overflow port positioned at a height corresponding to the desired maximum water level, the overflow port being interconnectable with the water reservoir to recirculate water from the basin to the reservoir.

24. A bird bath as set forth in claim 23, further comprising a mounting assembly for connecting the basin to a separate structure.

25. A bird bath as set forth in claim 23, further comprising a base having an inner compartment and a top opening, the pump module being sized for insertion into the inner compartment through the top opening.

26. A bird bath comprising:

a base having an inner compartment and a top opening;

a bird bath basin adapted to hold water and being mountable on the base at a location overlying the top opening;

a pump module comprising:

a housing defining a reservoir adapted to hold water and being sized for insertion into the inner compartment through the top opening;

a pump contained in the housing and being interconnectable with the basin for pumping water from the reservoir to the basin; and a power cord having a first end interconnected with the pump and a second terminating in a male electrical plug; and an overflow port positioned at a height corresponding to the desired maximum water level, the overflow port being interconnectable with the water reservoir to recirculate water from the basin to the reservoir.

\* \* \* \* \*